United States Patent
Wang et al.

(10) Patent No.: US 12,214,488 B2
(45) Date of Patent: Feb. 4, 2025

(54) ROBOTIC ARM AND ROBOT

(71) Applicants: Shanghai Flexiv Robotics Technology Co., Ltd., Shanghai (CN); Flexiv Ltd., Grand Cayman (KY)

(72) Inventors: Shiquan Wang, Foster City, CA (US); Hao Jiang, Mountain View, CA (US); Ran An, San Jose, CA (US); Xuesen Li, San Mateo, CA (US)

(73) Assignees: SHANGHAI FLEXIV ROBOTICS TECHNOLOGY CO., LTD., Shanghai (CN); FLEXIV LTD., Grand Cayman (KY)

( * ) Notice: Subject to any disclaimer, the term of this patent is extended or adjusted under 35 U.S.C. 154(b) by 232 days.

(21) Appl. No.: 16/558,985

(22) Filed: Sep. 3, 2019

(65) Prior Publication Data

US 2021/0060793 A1 Mar. 4, 2021

(51) Int. Cl.
 *B25J 13/08* (2006.01)
 *B25J 17/00* (2006.01)
 *B25J 18/00* (2006.01)
 *B25J 19/02* (2006.01)

(52) U.S. Cl.
 CPC ............ *B25J 13/085* (2013.01); *B25J 17/00* (2013.01); *B25J 18/00* (2013.01); *B25J 19/02* (2013.01)

(58) Field of Classification Search
 CPC . B25J 13/085; B25J 17/00; B25J 18/00; B25J 19/02
 See application file for complete search history.

(56) References Cited

U.S. PATENT DOCUMENTS

| | | | | |
|---|---|---|---|---|
| 4,704,909 | A * | 11/1987 | Grahn | G01L 5/166 |
| | | | | 73/862.043 |
| 8,726,741 | B2 * | 5/2014 | Krippner | G01L 3/1457 |
| | | | | 73/862.045 |
| 10,239,213 | B1 * | 3/2019 | Reich | B25J 9/1638 |
| 10,274,386 | B2 * | 4/2019 | Shafer | G01B 11/26 |
| 2016/0361125 | A1 * | 12/2016 | Balicki | B25J 19/06 |
| 2017/0007336 | A1 * | 1/2017 | Tsuboi | B25J 9/1674 |
| 2017/0363464 | A1 * | 12/2017 | Shafer | G01B 11/14 |
| 2019/0060019 | A1 * | 2/2019 | Maret | B25J 13/085 |
| 2020/0056950 | A1 * | 2/2020 | Strauss | B25J 13/085 |
| 2020/0348194 | A1 * | 11/2020 | Endo | G01L 3/108 |
| 2021/0131891 | A1 * | 5/2021 | Hoshino | G01L 5/0076 |

* cited by examiner

*Primary Examiner* — Jake Cook
(74) *Attorney, Agent, or Firm* — Dority & Manning, P.A.

(57) ABSTRACT

A robotic arm includes multiple joints and multiple links. The links are connected successively by the joints. At least two of the joints may each comprise a sensor configured to measure force and torque information in multiple DOF of its respective joint. In certain implementations, the sensor may be located between an input part of the respective one of the at least two joints and an output part of the respective one of the at least two joints.

5 Claims, 7 Drawing Sheets

ROBOTIC ARM AND ROBOT

TECHNICAL FIELD

The present disclosure generally relates to robotic technology, and in particular to a robotic arm and a robot.

BACKGROUND

Robotic arms are used in many industries to aid in manufacturing, assembling and other operations. In certain applications, it is advantageous to use torque-control based technology to control the movement of the robotic arm. Such robotic arms rely on accurate torque measurement.

A conventional robotic arm only has one single degree of freedom (DOF) torque sensor in each joint to measure the torque each corresponding joint generates or that is applied on each corresponding joint. Such a configuration can generate errors with regard to the measured torques and other forces on a joint, and thus presents a number of disadvantages for the operation of such conventional robotic arms.

SUMMARY

Accordingly, the present disclosure aims to provide a robotic arm and a robot.

A technical scheme adopted by the present disclosure is to provide a robotic arm. The robotic arm includes multiple joints and multiple links. The links are connected successively by the joints. At least two of the joints include at least six degrees of freedom (DOF). The at least two of the joints each comprise a sensor configured to measure force and torque information of more than one of the six DOF of the respective joint.

In a second aspect of the present disclosure, the sensor may be a six DOF force and torque sensor.

In a third aspect of the present disclosure, each of the multiple joints includes at least six DOF, and each of the multiple joints may include a sensor configured to measure force and torque information of more than one of the six DOF of a respective joint.

In a fourth aspect of the present disclosure, the sensor may be located between an input end of the respective joint and the previous link.

In a fifth aspect of the present disclosure which may be combined with the fourth aspect, the at least two of the joints may each further include a sensor circuit board communicating with the sensor. The sensor circuit board may be located at the input end of the respective joint and adjacent to the sensor.

In a sixth aspect of the present disclosure, the sensor may be located between the output end of the respective joint and the subsequent link.

In a seventh aspect of the present disclosure which may be combined with the sixth aspect, the at least two of the joints may each further include an additional sensor. The additional sensor may be located between the input end of the respective joint and the previous link.

In an eighth aspect of the present disclosure which may be combined with the seventh aspect, the sensor and the additional sensor of each of the at least two of the joints may be substantially identical.

In a ninth aspect of the present disclosure, a structure stiffness of the sensor in an actuation direction of the respective joint may be lower than the structure stiffness of the sensor in other directions.

In a tenth aspect of the present disclosure which may be combined with the ninth aspect, the sensor may be configured to measure a torque applied on the respective joint in the actuation direction and force and torque information of at least one of other five DOF of the respective joint.

In an eleventh aspect of the present disclosure, the at least two of the joints may be two adjacent joints.

In a twelfth aspect of the present disclosure, another technical scheme is to provide a robot. The robot includes multiple joints and multiple links. The links are connected successively by the joints. Each of the multiple links includes at least six DOF. The joints may each include a sensor configured to measure force and torque information of more than one of the six DOF of the respective joint.

In a thirteenth aspect of the present disclosure which may be combined with the twelfth, the sensor may be configured to measure a torque applied on the respective joint and at least force and torque information of one of the other five DOF of the respective joint.

In a fourteenth aspect of the present disclosure which may be combined with the thirteenth aspect, the sensor may be located between an input end and an output end of the respective joint.

In a fifteenth aspect of the present disclosure which may be combined with the thirteenth aspect, the sensor may be located between an input end of the respective joint and the previous link.

In a sixteenth aspect of the present disclosure which may be combined with the fifteenth aspect, each of the multiple joints may further include a sensor circuit board communicating with the sensor. The sensor circuit board may be located at the input end of the respective joint and adjacent to the sensor.

In a seventeenth aspect of the present disclosure which may be combined with the thirteenth aspect, the sensor may be located between an output end of the respective joint and the subsequent link.

In an eighteenth aspect of the present disclosure which may be combined with the seventeenth aspect, each of the multiple joints may further include an additional sensor. The additional sensor may be located between an input end of the respective joint and the previous link.

In a nineteenth aspect of the present disclosure which may be combined with the thirteenth aspect, the sensor may be a six DOF force and torque sensor.

In a twentieth aspect of the present disclosure which may be combined with the nineteenth aspect, a structure stiffness of the sensor in an actuation direction of the respective joint may be lower than the structure stiffness of the sensor in other directions.

BRIEF DESCRIPTION OF THE DRAWINGS

To more clearly explain the technical solutions in the embodiments of the present disclosure, the drawings used in the description of the embodiments will be briefly described below. The drawings in the following description are merely exemplary embodiments of the present disclosure. For those of ordinary skill in the art, other drawings may also be obtained based on these drawings without any creative work.

DETAILED DESCRIPTION

The disclosure will now be described in detail with reference to the accompanying drawings and examples. As will be apparent to one skilled in the art, the embodiments described in the present disclosure are merely exemplary and represent only a subset of all such embodiments. In particular, all other embodiments obtained by a person of ordinary skill in the art based on the embodiments of the present invention without creative efforts fall within the scope of the present disclosure.

Most conventional, advanced robotic arms have a single-DOF torque sensor in each joint to measure the torque each corresponding joint generates for joint torque control. Such a torque-control based robotic arm has the following disadvantages.

First, it is difficult to prevent the torque sensor from being affected by force and torque applied in other directions (e.g., different from the torque dimension the torque sensor is designed to sense), which is called sensor crosstalk. Thus, the sensor can deviate from a true torque value under different loading conditions (e.g., joint torque coupling). There are usually mechanical structures designed to reduce this effect, such as using bearings to constrain the force and torque that can transmit through the torque sensor. However, a mechanical structure may not always be able to fully reduce this effect. For example, a bearing can still deform under a bending moment perpendicular to the rotation axis. Therefore, the above-mentioned effect can be reduced but not eliminated. There are sensor design techniques to reduce torque sensor crosstalk effect, such as using multiple transducers (e.g., a strain gauge) in different positions to compensate for the effect. However, the effectiveness of such a technique is limited by design complexity, compactness requirements and manufacturing accuracy.

Second, in conventional robots, the torque sensor must be protected by a set of bearings to reduce the joint torque coupling effect. Therefore, the controlled torque delivered by the joint will be reduced by the friction from bearings, which impairs the force control accuracy. Third, the torque sensor is usually placed close to a gear drive (e.g., a harmonic drive). The gear drive can apply torque and force to the sensor in other directions when being actuated, which also impairs the sensing accuracy. One phenomenon impairing sensing accuracy is torque ripple appearing in the sensing signals. Fourth, due to manufacturing limitations such as non-ideal part tolerance and concentricity existing in the joint mechanism, the sensor will experience different micro deformations when the joint output position is different, which also impairs the sensing accuracy.

Accordingly, the present disclosure provides a robotic arm which has a multi-DOF force and/or torque sensor in at least some of the joints to sense more force and/or torque information transmitted through the joint and the link than conventional robotic arms.

Figure 1:
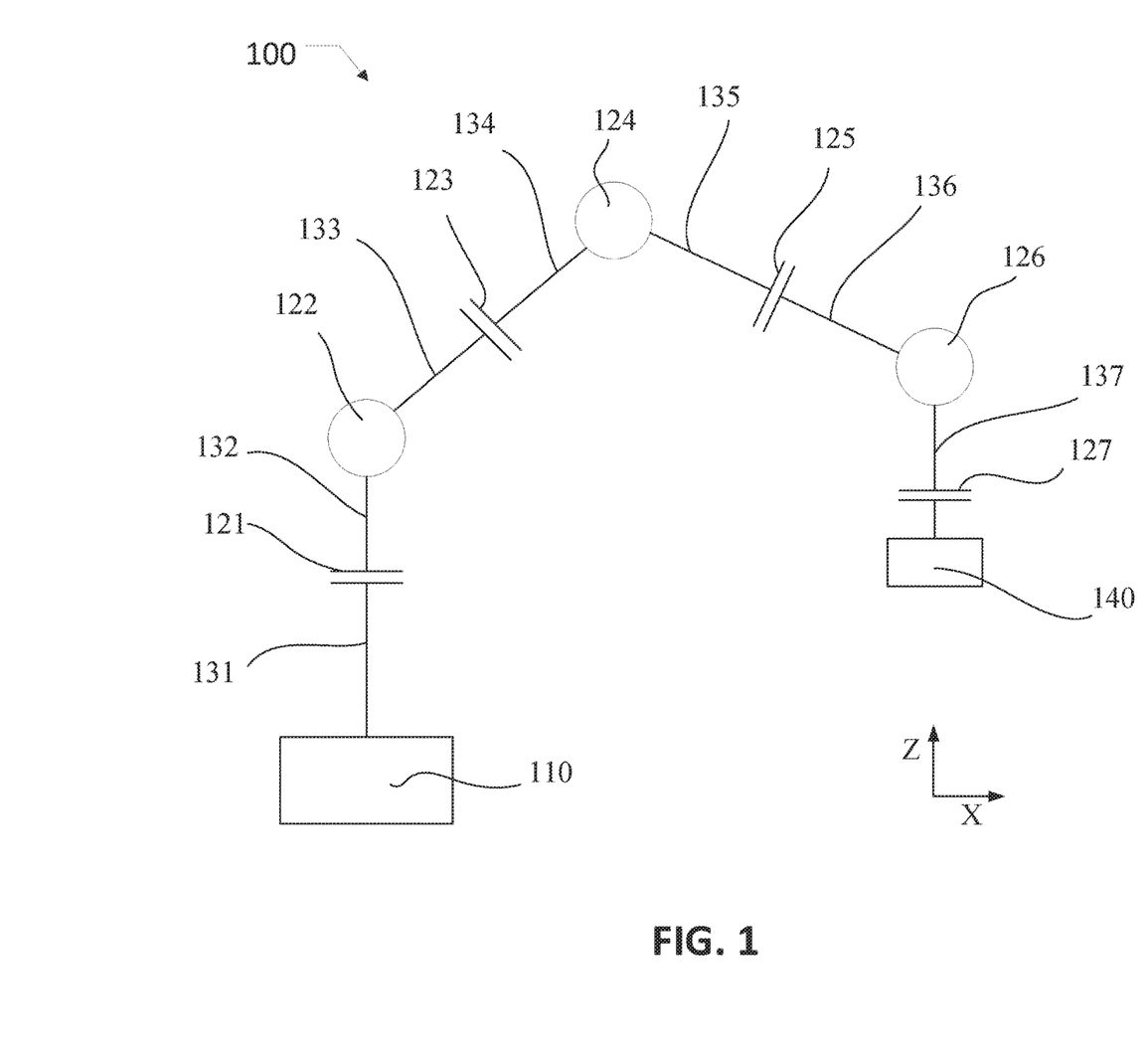
FIG. 1 illustrates a structural diagram of a robotic arm according to an embodiment of the present disclosure.

FIG. 1 illustrates a structural diagram of a robotic arm 100 according to an embodiment of the present disclosure. The robotic arm 100 may include multiple links 131-137 and multiple joints 121-127. The links 131-137 are successively connected by the joints 121-127. The joints 121-127 may be of two basic types, pitch joints and roll joints. The roll joints (e.g., the joints 121,123, 125 and 127 as shown in FIG. 1) may provide rotation about the longitudinal axis of adjacent links and the pitch joints (e.g., the joints 122, 124 and 126 as shown in FIG. 1) may provide rotation about axes substantially perpendicular to the roll joint axes. In some examples, an end effector 140 may be connected to the last joint (e.g., the joint 127). In the embodiment shown in FIG. 1, the robotic arm 100 is a 7-axis robotic arm. It should be appreciated that the below disclosed technical scheme may also be implemented for other types of robotic arms with more axes or less axes.

At least two of the joints 121-127 may each include a sensor which is configured to measure force and torque information (including three-direction force and three-direction torque information) of more than one of the six DOF of its respective joint. For example, the sensor may be a multi-DOF force and/or torque sensor. For instance, the joints 126 and 127 may be equipped with the multi-DOF force and/or torque sensor, or the joints 124-127 may all be equipped with the multi-DOF force and/or torque sensor. Alternatively, in some embodiments, all the joints 121-127 may each include the multi-DOF force and/or torque sensor.

In some embodiments, the sensor may be configured to measure a torque applied on its respective joint in the actuation direction of the joint. For example, if a pitch joint 122, 124 or 126 includes a multi-DOF force and/or torque sensor, the sensor may be utilized to measure a torque in the Y-direction (perpendicular to the X-direction and Z-direction shown in FIG. 1). If a roll joint 121, 123, 125 or 127 includes a multi-DOF force and/or torque sensor, the sensor may be utilized to measure a torque in the longitudinal direction between adjacent links. Moreover, the sensor may further be configured to measure force and torque information of at least one of the other five DOF. That is, the sensor may further be configured to measure one or more of the other three directions of forces and/or one or more of the other two directions of torque. For example, the multi-DOF force and/or torque sensor in corresponding joints may be configured to measure the torque in the actuation direction and the force each of the X, Y and Z directions.

The stiffness along each sensing DOF of the multi-DOF force and/or torque sensor can be optimized for better robot dynamics and control performance. In one example, the structure stiffness of the multi-DOF force and/or torque sensor in the actuation direction of the corresponding joint (e.g., around the joint axis) may be lower than the structure stiffness of the multi-DOF force and/or torque sensor in other directions. In such examples, the sensing sensitivity and resolution on the DOF that can be actively adjusted by actuation may be improved. In such examples, the stiffness on other DOFs of the structure may also remain high so as to maintain a high structure stiffness of the entire robotic arm for better control performance and higher mechanical and control bandwidth.

In some embodiments, the multi-DOF force and/or torque sensor may be a six DOF force and torque sensor that is capable of sensing torque and force information for all six DOF transmitting through the corresponding joint and the adjacent link where the joint is located. A six DOF force and torque sensor is designed to sense all of the force and torque experienced at a joint and the adjacent link, and thus may remain accurate under any combination of force and torque. U.S. patent application Ser. No. 16/456,588 discloses one exemplary 6-DOF force and torque sensor. In other examples of the present disclosure, however, other types of six DOF force and torque sensors may also be utilized.

FIGS. 2-5 show different arrangements of a sensor of a joint. In FIGS. 2-5, the joints 200a-200d each include an input part 201, an output part 202, a motor 203, a gear drive 204, a multi-DOF force and/or torque sensor 205 and one or more bearing 206. The stator of the motor 203 may be fixed to the input part 201 and the rotor of the motor 203 may be fixed to the output part 202 such that the motor 203 may drive the output part 202 to rotate with respect to the input part 201. The gear drive 204 may be connected to the rotor of the motor 203 to adjust the rotation speed of the output part 202 and output torque. In some embodiments, the gear drive 204 may be a harmonic drive. In some examples, the bearing 206 may be located between the input part 201 and the output part 202 to allow relative rotation between these two parts.

Figure 2:
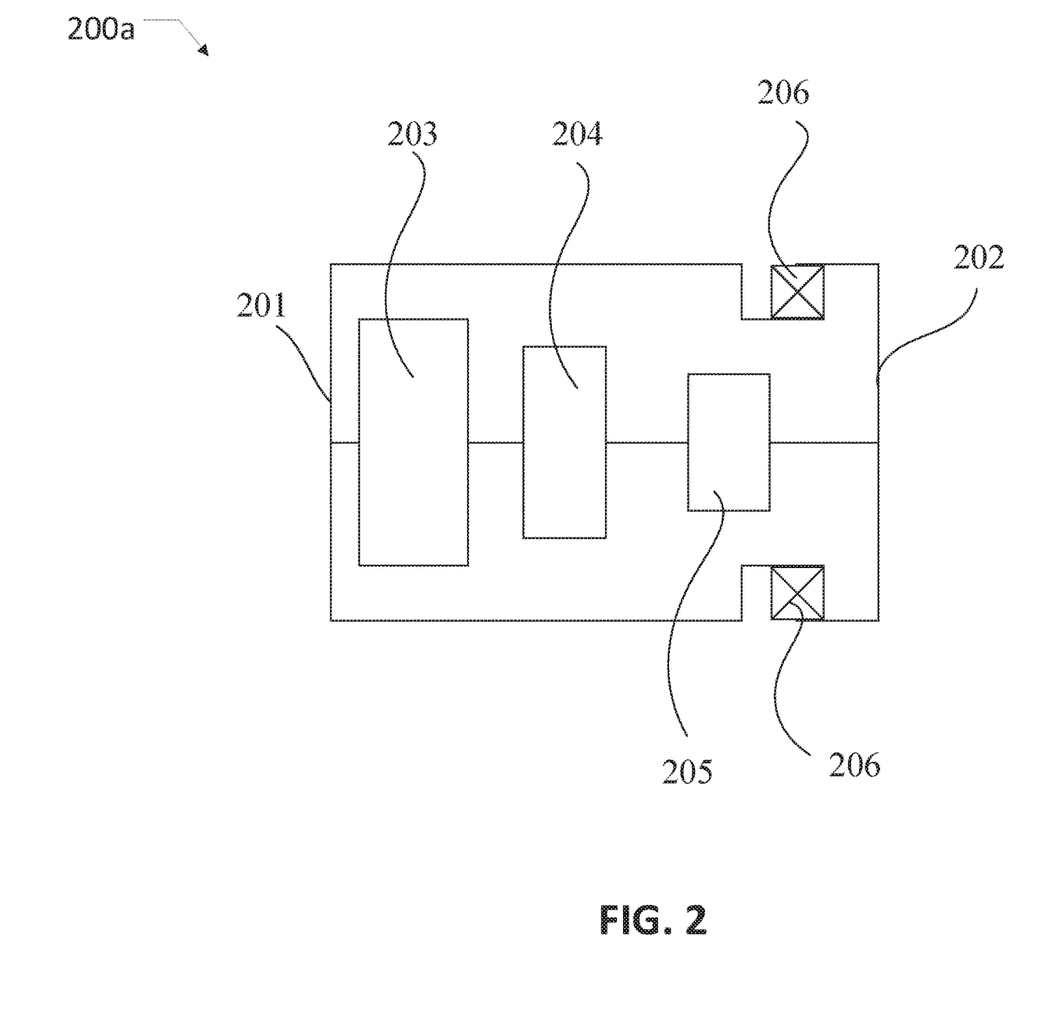
FIGS. 2 to 5 show several exemplary arrangements of a multi-DOF force and/or torque sensor of a joint according to some embodiments of the present disclosure.

In an embodiment as shown in FIG. 2, the multi-DOF force and/or torque sensor 205 of the joint 200a may be placed between the input part 201 and the output part 202 (e.g., between the gear drive 204 and the output part 202), which is similar to a joint with a single-DOF torque sensor. In this embodiment, since the bearing 206 is designed to take bending moments from the output part 202 to the input part 201, the multi-DOF force and/or torque sensor 205 may be configured to only measure a torque in the actuation direction of the joint 200a and an axial force transmitted from the output part 202 to the input part 201.

Figure 3:
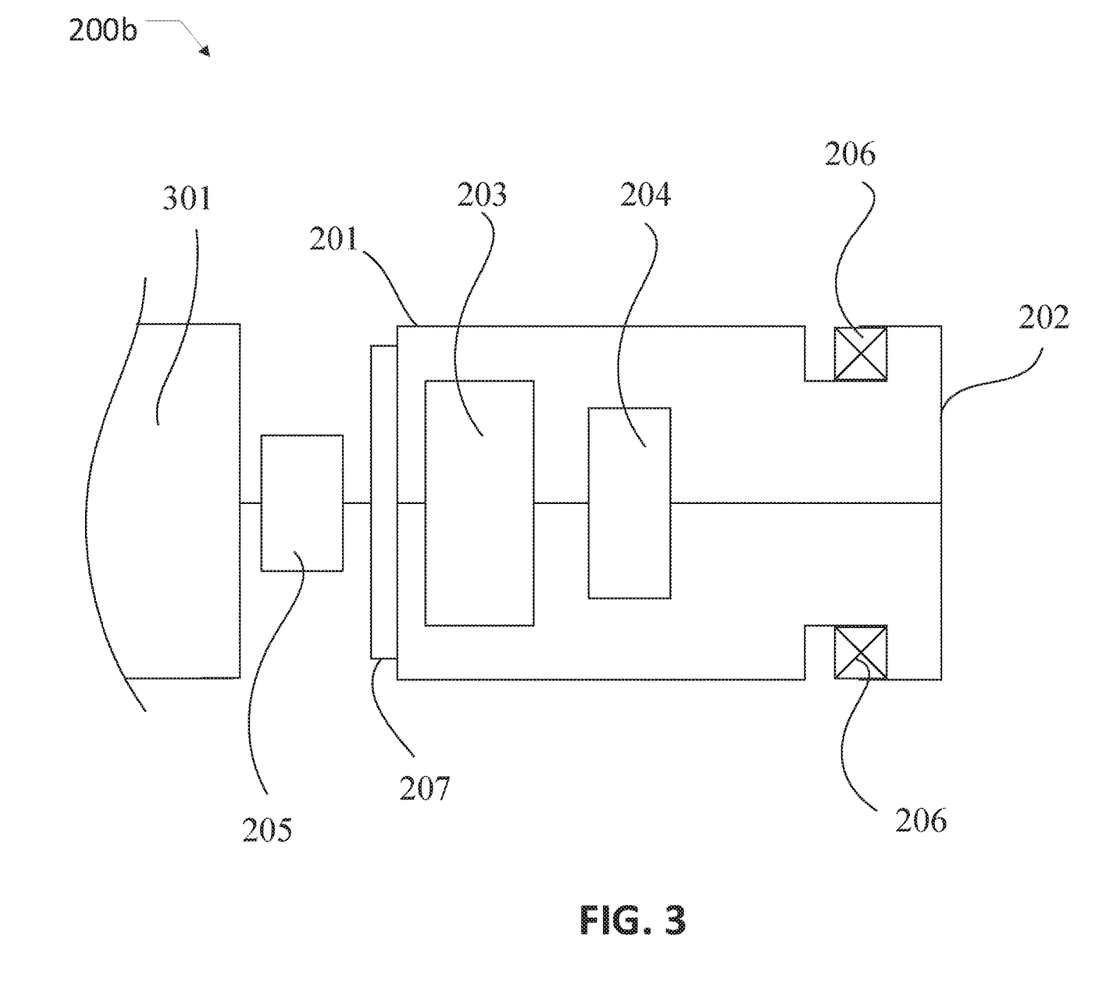

In an embodiment as shown in FIG. 3, the multi-DOF force and/or torque sensor 205 of the joint 200b may be placed between the input part 201 of the joint 200b and the previous link 301. In this embodiment, the multi-DOF force and/or torque sensor 205 can be designed to measure force and torque information of any number of the six DOF. For example, the multi-DOF force and/or torque sensor 205 may be a three DOF force sensor capable of measuring force information in all three force directions, a three DOF torque sensor capable of measuring torque information in all three torque directions, a four DOF force and torque sensor capable of measuring force information in all three force directions and a torque in the actuation direction of the joint 200b, etc.

In one embodiment, the multi-DOF force and/or torque sensor 205 may be a six DOF force and torque sensor that is capable of sensing all the force and torque transmitted between the previous link 301 and the input part 201 of the joint 200b. The joint 200b may further include a sensor circuit board 207 communicating with the multi-DOF force and/or torque sensor 205. The sensor circuit board 207 may be located at the input end of the input part 201 of the joints 200b and adjacent to the multi-DOF force and/or torque sensor 205. This example configuration may largely simplify the wiring configuration of the multi-DOF force and/or torque sensor 205 and the sensor circuit board 207.

Figure 4:
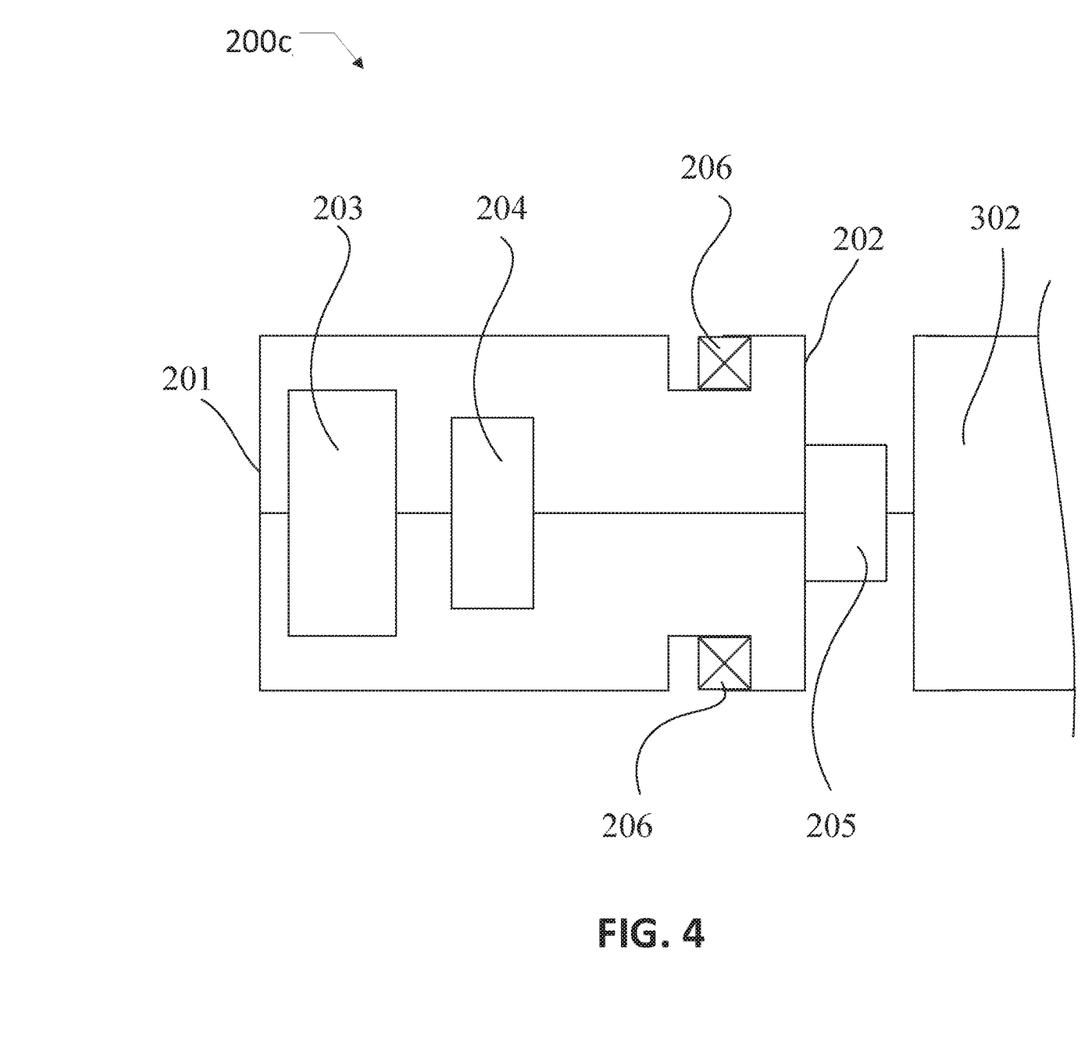

In an embodiment as shown in FIG. 4, the multi-DOF force and/or torque sensor 205 of the joint 200c may be placed between the output part 202 of the joint 200c and the subsequent link 302. In this embodiment, the multi-DOF force and/or torque sensor 205 can be designed to measure force and torque information of any number of the six DOF. For example, the multi-DOF force and/or torque sensor 205 may be a three DOF force sensor capable of measuring force information in all three force directions, a three DOF torque sensor capable of measuring torque information in all three torque directions, a four DOF force and torque sensor capable of measuring force information in all three force directions and a torque in the actuation direction of the joint 200b, etc.

In one embodiment, the multi-DOF force and/or torque sensor 205 may be a six DOF force and torque sensor that is capable of sensing all the force and torque transmitted between the output part 202 of the joint 200b and the subsequent link 302. In this embodiment, there is less compliance between the actuation output and the sensing component (e.g., the multi-DOF force and/or torque sensor 205) compared with the above-described embodiment where the multi-DOF force and/or torque sensor 205 is placed at the input end or inside the corresponding joint (as shown in FIG. 2 or FIG. 3), and therefore the torque sensing accuracy and control performance of the joint 200c may be improved.

In the embodiments shown in FIGS. 3 and 4, since the sensor 205 is a multi-DOF force and/or torque sensor, it can be placed outside the input part 201, the output part 202 and the bearing 206 without undermining the sensing accuracy. Thus, the multi-DOF force and/or torque sensor 205 may be flexibly installed anywhere on the joint for various design benefits such as simplifying the wiring configuration or optimal joint design for better dynamics and control performance.

Figure 5:
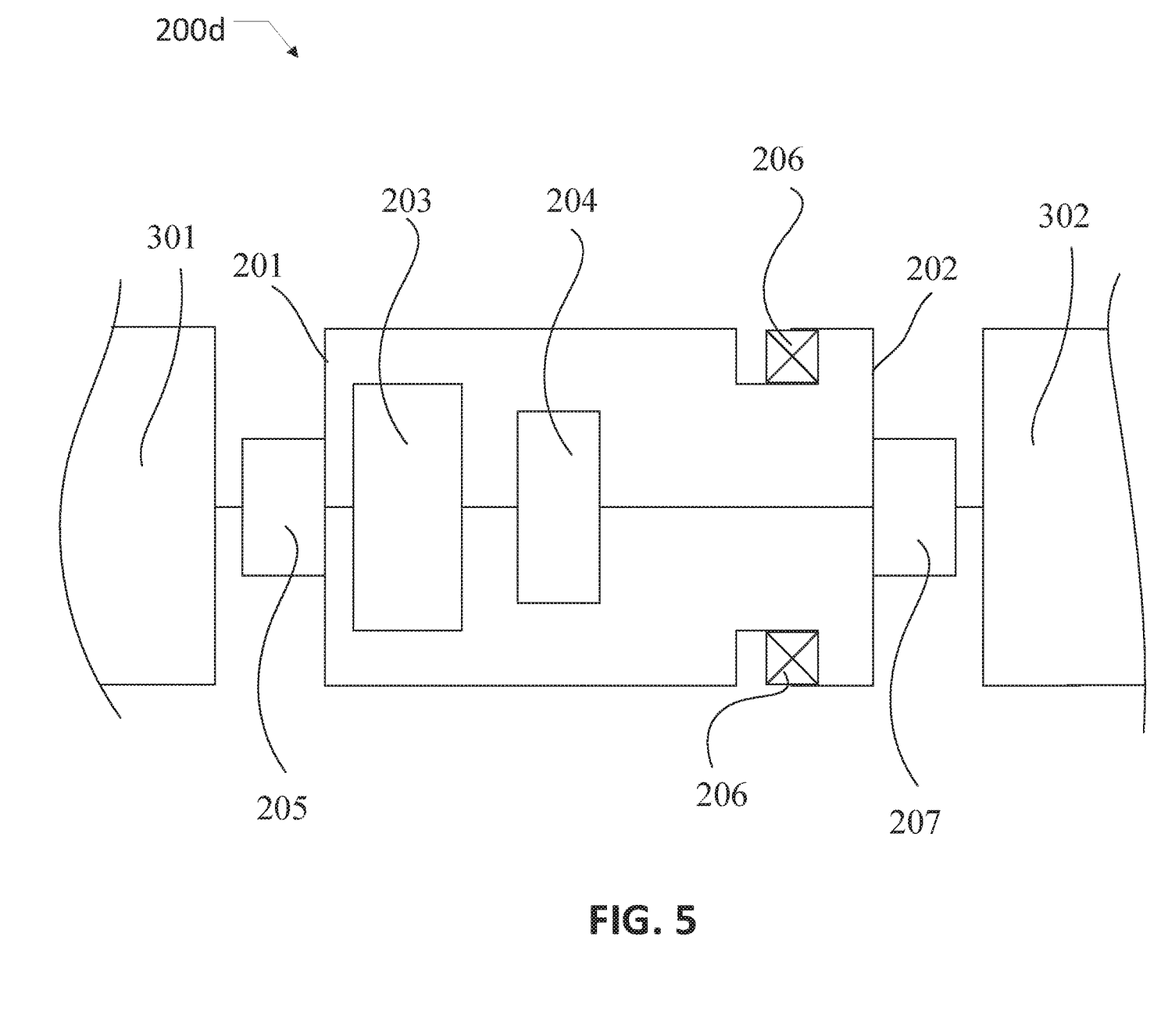

In an embodiment shown in FIG. 5, the joint 200d may include two multi-DOF force and/or torque sensors 205 and 207. The first sensor 205 may be located between the input part 201 of the joint 200d and the previous link 301, while the second sensor 207 may be located between the output part 202 of the joint 200d and the subsequent link 302. Either of the two sensors 205 and 207 may be redundant of the other one in order to improve the accuracy of measuring force and torque information. In some examples, additional redundant sensors in the robotic arm 100 can be used for cross-check for fault detection and better safety. In some embodiments, the sensors 205 and 207 may be substantially identical. In other embodiments, the sensor 207 may be different from the sensor 205. For example, the force and torque information the sensor 207 measures may be different from that the sensor 205 measures.

Figure 6A:
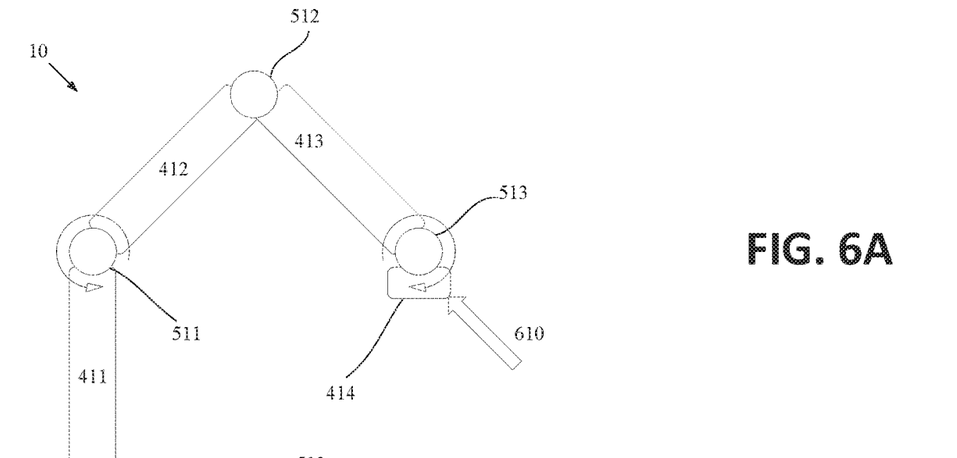
FIGS. 6A to 6C show schematics of a robot arm in which each joint includes a single-DOF torque sensor.
Figure 6B:
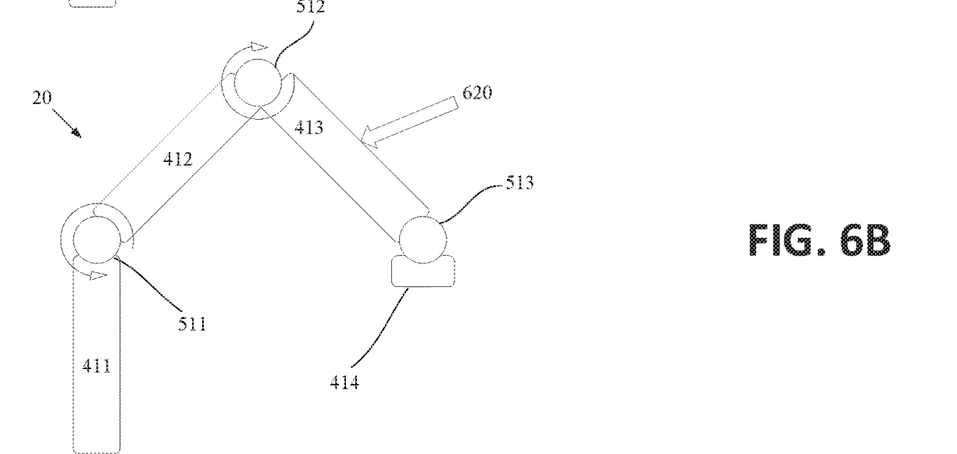
Figure 6C:
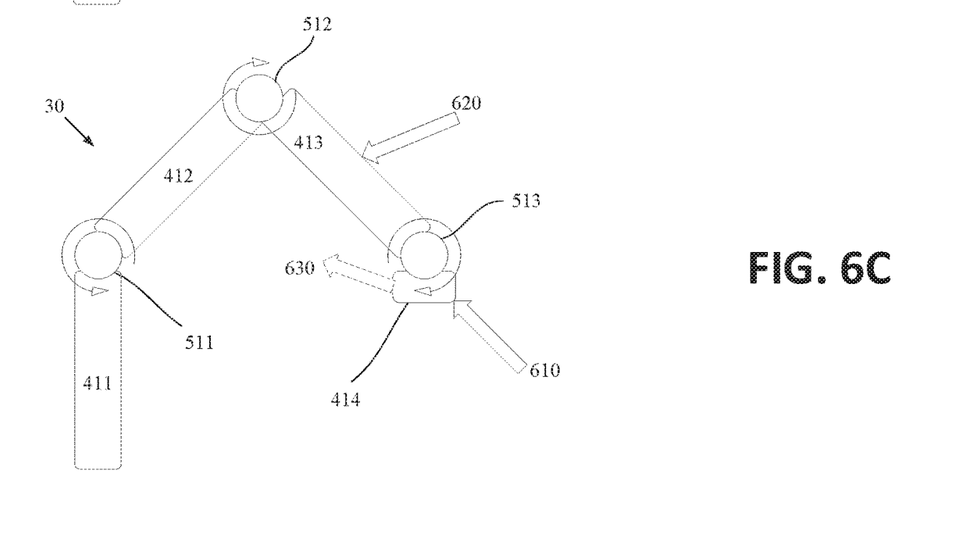

FIGS. 6A to 6C show an example scenario where each joint of a robotic arm includes a single-DOF torque sensor. In this example, the robot includes three links 411-413, three joints 511-513 and an end effector 414. Each of the joints 511-513 includes a sensor configured to measure only the torque in the actuation direction of the corresponding joint. When a load 610 is applied on the end effector 414, the sensors in the joints 511 and 513 may each sense a one-DOF torque, as shown on the robotic arm 10 in FIG. 6A. When a load 620 is applied on the link 413, the sensors in the joints 511 and 512 may each sense a one-DOF torque, as shown on the robotic arm 20 in FIG. 6B. When the load 610 and the load 620 are simultaneously applied on the end effector 414 and the link 413 respectively, the sensors in the joints 511-513 may each sense a one-DOF torque, as shown on the robotic arm 30 in FIG. 6C. However, in this example scenario the robot is not able to correctly identify the two loads 610 and 620. Instead, the robot may mistake the loads 610 and 620 as a single false load 630 on the end effector, because the sensing results of the multi-DOF sensors in the situation where one load 630 is applied is the same as those in the situation where two loads 610 and 620 are applied. Accordingly, this may undermine the control performance of the robot and the ability for the robot to function properly in a complex environment.

Figure 7A:
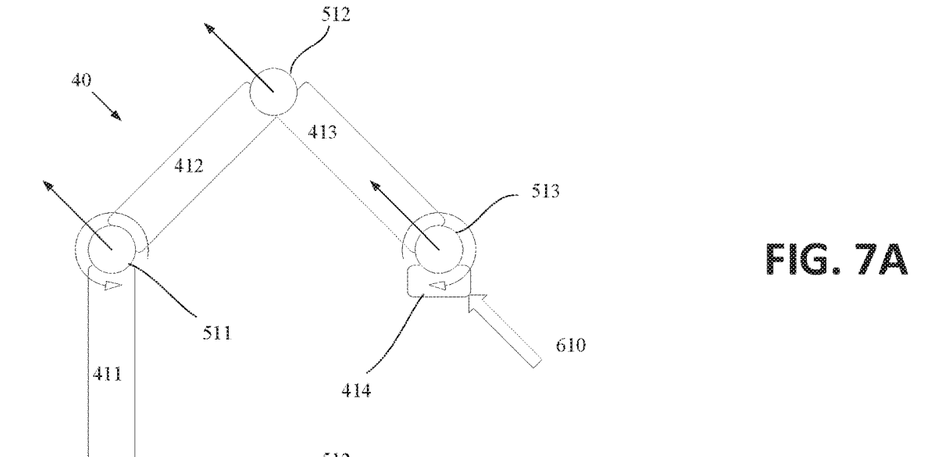
FIGS. 7A to 7C show schematics of a robotic arm in which each joint includes a multi-DOF force and/or torque sensor.
Figure 7B:
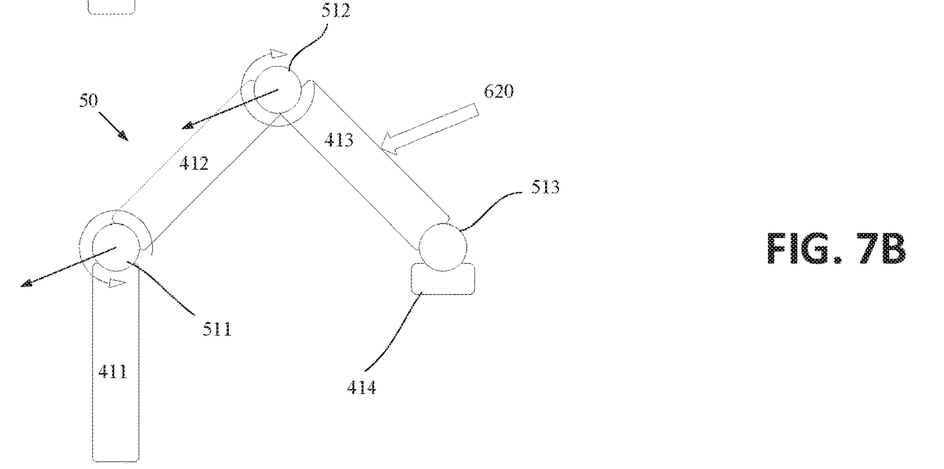
Figure 7C:
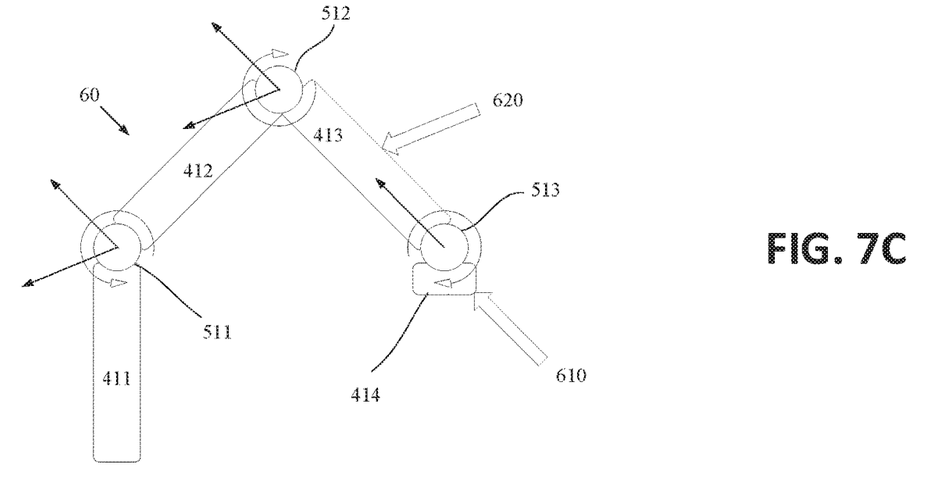

In comparison, FIGS. 7A to 7C show an example scenario where each joint of a robotic arm includes a multi-DOF force and/or torque sensor. In this example, the robot includes three links 411-413, three joints 511-513 and an end effector 414. Each of the joints 511-513 includes a sensor configured to measure force and/or torque information of multiple, for example, a torque in the actuation direction of the corresponding joint and two forces perpendicular to the actuation direction of the corresponding joint. When a load 610 is applied on the end effector 414 of the robotic arm 40 in FIG. 7A, the sensors in the joints 511 and 513 may each sense a one-DOF torque and a one-DOF force, and the sensor in the joint 512 may sense a one-DOF force. When a load 620 is applied on the link 413 of the robotic arm 50 in FIG. 7B, the sensors in the joints 511 and 512 may each sense a one-DOF torque and a one-DOF force. When the load 610 and the load 620 are simultaneously applied on the end effector 414 and the link 413 respectively of the robotic arm 60 in FIG. 7C, the sensors in the joints 511 and 512 may each sense a one-DOF torque and a two-DOF force, and the sensor in the joint 513 may sense a one-DOF torque and a one-DOF force. Accordingly, in this implementation, the two loads 610 and 620 may be accurately identified since the sensing results of the multi-DOF sensors in the situation where one load 630 is applied is different from those in the situation where two loads 610 and 620 are applied. Thus, with multi-DOF force and/or torque sensors, even with different loads on different locations, the robot can still estimate each load precisely.

In some embodiments, two adjacent joints of a robot may both be equipped with a six DOF force and torque sensor. The two adjacent joints (e.g., the joints 125 and 126 in FIG. 1) may be denoted by Joint N and Joint (N+1), and the sensor reading on corresponding joints may be $\vec{F}_N$ and $\vec{F}_{N+1}$ (converted to the same coordinate), which are both six DOF vectors. $\vec{D}$ is the total inertia force between the two joints. Assuming a single point contact is applied anywhere on the link (e.g., the link 136 in FIG. 1) between the two joints, then six DOF information of the point contact (e.g., two DOF position on the link, one DOF normal force, two DOF shear forces and one DOF torsional force) can be computed based on $T(\vec{F}_N, \vec{F}_{N+1}, \vec{D})$, where T is a transformation function to solve the problem. Such point contact information can be used for multiple purposes, including better human-robot interface and safety.

For example, the robot may know the point contact over its body better so that the robot can react more properly to protect a human operator and differentiate abnormal collision from normal interactive contact. In another example, a human operator can draw certain patterns with certain force profiles on certain links of the robot to give certain commands to the robot. Based on the previous analysis, the effect of the point contact on adjacent joints can be computed by projecting $\vec{F}_N, \vec{F}_{N+1}, \vec{D}$ to the corresponding joints so that the local torque controller of each joint can generate additional torque to compensate for this effect. Thus, the whole arm can better resist disturbance over the arm without affecting the operated tasks and the end effector.

In the above-described embodiments, six DOF force and torque sensors are utilized. In certain examples of the present disclosure, sensors capable of measuring force and torque information of less DOFs may be used for detecting simpler contact forces on the arm. For example, four DOF sensors, which are not capable of measuring force and torsion along and around the link axis, can be utilized to perceive contact force on the link in the case that the user only applies normal force with no shear or torsional friction on the arm.

Referring to FIG. 1, in some embodiments, each of the joints 121-127 of the robot 100 may be equipped with a multi-DOF force and/or torque sensor, which in some aspect may be a six DOF force and torque sensor. In such embodiments, additional redundant sensors in the arm can be fused together to improve the sensing accuracy. For example, averaging the sensors' output on the same force direction from multiple joints of a stationary robotic arm can reduce the overall sensing error in that direction. If a sensor has noise or error standard deviation of σ in one sensing direction, then with a seven DOF arm and a six DOF sensor in each joint, the error standard deviation may become $\sigma/\sqrt{7}$. The force and torque sensors in the joints can be used to accurately estimate external contact force position, orientation and magnitude on each of the robot links 131-137, which is useful information for more advanced human-robot interactions and interfaces. Since the torque and force sensors do not have to be placed inside the joints 131-137, they can be more flexibly installed anywhere on the corresponding joints for design benefits such as simplifying the wiring configuration or optimal joint design for better dynamics and control performance.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

What is claimed is:

1. A robotic arm, comprising:
   a plurality of joints including three or more joints that include at least a pitch joint and a roll joint, wherein each of the joints includes a motor, a gear drive, and a force and torque sensor, and the force and torque sensor is provided outside an input end and an output end of a respective one of the plurality of joints;
   a plurality of links connected successively by the plurality of joints, wherein the force and torque sensor is configured to measure force and torque information of the respective one of the plurality of joints in multiple degrees of freedom (DOF), and wherein a structure stiffness of the force and torque sensor in an actuation direction of the respective one of the plurality of joints is lower than a structure stiffness of the force and torque sensor in other directions.

2. A robot comprising:
   a plurality of joints including three or more joints that include at least a pitch joint and a roll joint; wherein each of the joints includes a motor, a gear drive and a force and torque sensor, and the force and torque sensor is provided outside an input end and an output end of a respective one of the plurality of joints, and
   a plurality of links connected successively by the plurality of joints, wherein each the force and torque sensor is configured to measure force and torque information of the respective one of the plurality of joints in multiple degrees of freedom (DOF), and wherein a structure stiffness of the force and torque sensor in an actuation direction of the respective one of the plurality of joints is lower than a structure stiffness of the force and torque sensor in other directions.

3. The robot of claim 2, wherein the sensor is configured to measure a torque applied on the respective one of the plurality of joints and force and torque information of at least one additional DOF of the respective one of the plurality of joints.

4. The robotic arm of claim 1, wherein the sensor is configured to measure force and torque information comprising only a torque applied in an actuation direction of the respective one of the plurality of joints and a force applied in a direction perpendicular to the actuation direction.

5. The robot of claim 2, wherein the sensor is configured to measure force and torque information comprising only a torque applied in an actuation direction of the respective one of the plurality of joints and a force applied in a direction perpendicular to the actuation direction.

\* \* \* \* \*